(12) United States Patent
Azana et al.

(10) Patent No.: US 11,366,012 B2
(45) Date of Patent: Jun. 21, 2022

(54) METHOD AND SYSTEM FOR GENERATING TIME-FREQUENCY REPRESENTATION OF A CONTINUOUS SIGNAL

(71) Applicant: INSTITUT NATIONAL DE LA RECHERCHE SCIENTIFIQUE (INRS), Quebec (CA)

(72) Inventors: Jose Azana, Montreal (CA); Konatham Saikrishna Reddy, Montreal (CA); Reza Maram, Montreal (CA); Hugues Guillet De Chatellus, Corenc (FR)

(73) Assignees: INSTITUT NATIONAL DE LA RECHERCHE SCIENTIFIQUE (INRS), Quebec (CA); CENTRE NATIONAL DE LA RECHERCHE SCIENTIFIQUE (CNRS, Paris (FR); UNIVERSITÉ GRENOBLE ALPES, Saint-Martin (FR)

( * ) Notice: Subject to any disclaimer, the term of this patent is extended or adjusted under 35 U.S.C. 154(b) by 60 days.

(21) Appl. No.: 16/583,736

(22) Filed: Sep. 26, 2019

(65) Prior Publication Data

US 2021/0096026 A1    Apr. 1, 2021

(51) Int. Cl.
*G01J 3/28*    (2006.01)
*G02B 6/02*    (2006.01)
*G01J 11/00*   (2006.01)

(52) U.S. Cl.
CPC ............. *G01J 3/2803* (2013.01); *G01J 11/00* (2013.01); *G02B 6/02261* (2013.01); *G01J 2003/2886* (2013.01)

(58) Field of Classification Search
CPC .. G01J 3/2803; G01J 11/00; G01J 2003/2886; G02B 6/02261
See application file for complete search history.

(56) References Cited

U.S. PATENT DOCUMENTS

| | | | | |
|---|---|---|---|---|
| 2011/0015931 A1* | 1/2011 | Kawahara | ............... | G10L 21/00 704/264 |
| 2012/0140809 A1* | 6/2012 | Krause | .................... | H04L 1/205 375/224 |
| 2014/0300951 A1* | 10/2014 | Messerly | ............ | H01S 3/06758 359/334 |

OTHER PUBLICATIONS

Azana, Jose et al., Real-Time Optical Spectrum Analysis Based on the Time-Space Duality in Chirped Fiber Gratings, IEEE J. Quant. Electron. 36, 517-526 (2000).

(Continued)

*Primary Examiner* — Hugh Maupin
(74) *Attorney, Agent, or Firm* — Fasken Martineau Dumoulin LLP; Serge LaPointe

(57) ABSTRACT

A method and a system for generating a time-frequency representation of an aperiodic continuous input signal comprising generating a periodic train of short pulses having a repetition frequency, and sampling the signal temporally using the periodic train of short pulses to obtain a temporally sampled signal, the temporally sampled signal comprising a plurality of sampled copies of the input signal, each sampled copy being spaced in function of the repetition frequency of the periodic train of short pulses. The temporally sampled signal is delayed based on the repetition frequency to obtain a delayed temporally sampled signal comprising a plurality of delayed sampled copies, a spectral representation of a given delayed sampled copy being delayed in function of the repetition frequency. The delayed temporally sampled signal is evaluated over consecutive time slots to obtain, for each consecutive time slot, a respective output signal in the time-frequency domain.

21 Claims, 6 Drawing Sheets

(56) References Cited

OTHER PUBLICATIONS

Goda, K. et al., Dispersive Fourier Transformation for Fast Continuous Single-Shot Measurements, Nat. Photonics, vol. 7(2), 102-112 (2013).

Tainta, S. et al. ,Temporal Self- Imaging Effect for Periodically Modulated Trains of Pulses. Opt. Express 22, 15251-1526 (Jun. 2014).

Xie, Q. et al., Reconfigurable Envelope Generation of Optical Pulse Train Based on Discrete Fourier Transform. IEEE Photonics Technology Letters, vol. 30 (3), 242-245 (2018).

De Chatellus, Guillet, et al., Optical Real-Time Fourier Transformation with Kilohertz Resolutions. Optica 3, 1-8 (2016).

Mahjoubfar, Ata et al., Time Stretch and Its Applications, Nature Photonics, vol. 11, 341-351 (Jun. 2017).

Ryczowski, P. et al., Real-Time Full-Field Characterization of Transient Dissipative Soliton Dynamics in a Mode-Locked Laser, Nature Photonics, vol. 12, 221-227, (Apr. 2018).

Schwartz, Joshua D., Experimental Demonstration of Real-Time Spectrum Analysis Using Dispersive Microstrip, IEEE, vol. 16 (4), 215-217 (Apr. 2006).

Solli, D. R. et al., Amplified Wavelength-Time Transformation for Real-Time Spectroscopy, Nature Photonics, vol. 2, 48-51 (Jan. 2008).

Zhang, Chi et al., Ultrafast and Versatile Spectroscopy by Temporal Fourier Transform. Scientific Reports, 1-8 (Jun. 2014).

Herink, G, et al., Real-Time Spectral Interferometry Probes the Internal Dynamics of Femtosecond Soliton Molecules,Science 356, 50-54 (Apr. 2017).

Jack, Mervyn A., The Theory, Design, and Applications of Surface Acoustic Wave Fourier-Transform Processors, IEEE, vol. 68 (4), 450-468 (Apr. 1980).

Jannson, Tomasz, Real-Time Fourier Transformation in Dispersive Optical Fibers, Optical Letters, vol. 8 (4), 232-234 (Apr. 1983).

Time-Frequency Signal Analysis Based on the Windowed Fractional Fourier Transform, LJubiša Stankovic, Tatiana Alieva, Martin J. Bastiaans (Time-Frequency Signal Analysis).

\* cited by examiner

METHOD AND SYSTEM FOR GENERATING TIME-FREQUENCY REPRESENTATION OF A CONTINUOUS SIGNAL

FIELD

The present technology relates to signal processing in general and more specifically to a method and a system for generating a time-frequency representation of a continuous signal.

BACKGROUND

Fourier transforms are tools which are used regularly in signal processing to decompose a signal in function of time into its constituent frequencies. However, Fourier transforms fail to provide critical information regarding the time(s) of occurrence of the signal's frequency components. Most natural and man-made temporal waveforms exhibit a frequency content that changes over time, so a more comprehensive and useful spectral analysis calls for a signal representation as a function of both the time and frequency, i.e., as a two-dimensional (2D) distribution in the joint time-frequency domain. The short-time Fourier transform (STFT), a Fourier transform of consecutive time-windowed sections of a signal, have been proven useful to analyze the signal in the joint time-frequency domain.

A spectrogram, which is a visualized representation of a spectrum of a frequency of a signal as it varies in time, can be obtained based on the STFT. A spectrogram is a very powerful joint time-frequency signal analysis tool, which has proven essential to many important applications, including speech and sound analysis, information processing and communications based on radio-frequency (RF), terahertz or optical waves etc.

However, current methods for calculating STFTs and spectrograms suffer from some drawbacks, as most methods are based on digitizing the signal to be analyzed by performing analog-to-digital conversion (ADC), and Fourier transformation in the digital domain, also known as digital signal processing (DSP). These approaches are sometimes inefficient for STFT calculations of high-speed broad frequency bandwidth signals, as they are difficult to digitize, and they require enormous DSP resources, e.g., leading to unpractical processing times (latencies) and power consumption for some applications. Generally, it is challenging to perform STFT calculations of signals with a frequency bandwidth above the sub-gigahertz (GHz) range in a real time fashion.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Embodiments of the present technology have been developed based on developers' appreciation that a short-time Fourier transform (STFT) or spectrogram of a signal is presently obtained by detecting a waveform of interest, followed by analog-to-digital conversion (ADC) and subsequent digital signal processing (DSP). Hence, STFT or spectrogram analysis involves digital computation of Fourier transform (FT) of temporally-windowed consecutive sections of the signal under test using fast Fourier transform (FFT) algorithms after analog to digital conversion (ADC).

More specifically, developers of the present technology have appreciated that conventional STFT, digital computation of Fourier transforms requires computationally intensive fast Fourier transform (FFT) algorithms. As the signal complexity and speed increases, digital computation of FT leads to impractical DSP performance metrics, e.g., in terms of massive energy consumption or unrealistic processing time delays. Further, STFT analysis of high-speed signals, with frequency bandwidths above a few GHz, quickly surpasses the capabilities of available ADC devices. These represent crucial limitations for application of STFT based signal processing to wide range of problems that involve for high-speed (broadband) temporal waveforms.

The present technology enables computation of STFT of a high-speed arbitrary continuous signal (e.g., infinitely long microwave or optical waveforms) in the analog physical waveform domain purely in real time. Particularly, the present technology enables STFT analysis which neither requires high-speed DSP engines for computing intensive fast Fourier transforms nor the front end analog electronic circuits for analog to digital conversion. The present technology is suitable for computation of STFT of high-speed broadband waveforms requiring simple analog signal processing units.

As such, the present technology could be readily applied for analysis of a wide range of signals, including high-speed microwave or ultrafast optical waveforms, which may be aperiodic, for which real-time implementations of time-frequency analysis and related processing tools are presently not available.

Thus, embodiments of the present technology are directed to a method and a system for generating a time-frequency representation of a continuous signal.

In accordance with a broad aspect of the present technology, there is provided a method for generating a time-frequency representation of an aperiodic continuous input signal, the method comprising: receiving the input signal, generating a periodic train of short pulses, the periodic train of short pulses having a repetition period corresponding to a repetition frequency, the repetition frequency being below a bandwidth of the input signal. The method comprises sampling the input signal temporally using the periodic train of short pulses to obtain a temporally sampled signal, the temporally sampled signal comprising a plurality of sampled copies of the input signal, each sampled copy being spaced in function of the repetition frequency of the periodic train of short pulses. The method comprises delaying the temporally sampled signal based on the repetition period to obtain a delayed temporally sampled signal, the delayed temporally sampled signal comprising a plurality of delayed sampled copies, a spectral representation of a given delayed sampled copy being delayed in function of the repetition frequency, and evaluating the delayed temporally sampled signal over consecutive time slots to obtain, for each consecutive time slot, a respective output signal, the respective output signal being in the time-frequency domain.

In some embodiments of the method, an intensity of the delayed temporally sampled signal is proportional to a time-frequency energy distribution of the input signal.

In some embodiments of the method, each pulse of the periodic train of short pulses has a pulse temporal width, the pulse temporal width being below the repetition period.

In some embodiments of the method, each sampled copy of the plurality of sampled copies of the input signal is: shifted by $q\omega_R$, and weighted by a Fourier coefficient of the periodic train of short pulses $P(q\omega_R)$ where $\omega_R$ is the repetition frequency and $q = 0, \pm 1, \pm 2, \ldots, \pm \infty$.

In some embodiments of the method, each consecutive time slot has a duration corresponding to the repetition frequency $\omega_R$.

In some embodiments of the method, each delayed sampled copy is shifted in time by the repetition period $T_R$, shifted in frequency by the repetition frequency $\omega_R$, and weighted by a Fourier coefficient of the periodic train of short pulses $P(q\omega_R)$.

In some embodiments of the method, the N-th consecutive time slot is defined by:

$$NT_R - \frac{T_R}{2} \leq t_2 < NT_R + \frac{T_R}{2}$$

where $t_2=t_1-\Delta t_{latency}$ is a time variable of the delayed temporally sampled signal, $t_1$ is the time variable of the input signal, and $\Delta t_{latency}$ is a latency induced by at least one of the temporal sampling and the delaying, and $N=0, \pm 1, \pm 2, \ldots$.

In some embodiments of the method, the respective output signal is proportional to a time-mapped copy of a Fourier transform of the input signal truncated by a temporal window centered at $NT_R$.

In some embodiments of the method, the sampling is executed by a temporal sampling unit, the delaying is executed by a frequency dependent time delay unit, and the evaluating is executed by a temporal evaluation unit.

In some embodiments of the method, the frequency dependent time delay unit is one of: a dispersion compensating fiber (DCF), and a chirped fiber Bragg grating.

In some embodiments of the method, the input signal is in the microwave range, and the temporal sampling unit is an electro-optic modulator.

In some embodiments of the method, the input signal is in the optical range, and the temporal sampling unit is a non-linear optical system.

In some embodiments of the method, the delaying is executed in a frequency-shifted feedback (FSF) laser system.

In accordance with a broad aspect of the present technology, there is provided an analog system for generating a time-frequency representation of a continuous aperiodic input signal, the system comprising: a pulse source operable to generate a periodic train of short pulses, the periodic train of short pulses having a repetition period corresponding to a repetition frequency, the repetition frequency being below a bandwidth of the input signal. The system comprises a temporal sampling unit operable to sample the input signal using the periodic train of short pulses to generate a delayed temporally sampled signal, the delayed temporally sampled signal comprising a plurality of sampled copies of the input signal, each sampled copy being spaced in function of the repetition frequency of the periodic train of short pulses. The system comprises a frequency-dependent time delay unit operable to generate, based on the plurality of sampled copies of the input signal and the repetition period, a temporally sampled delayed signal comprising a plurality of delayed sampled copies of the input signal, a spectral representation of a given delayed sampled copy being delayed in function of the repetition frequency. The system comprises a temporal evaluation unit operable to evaluate the delayed temporally sampled signal over consecutive time slots to obtain, for each consecutive time slot, a respective output signal, the respective output signal being in the time-frequency domain.

In some embodiments of the system, an intensity of the delayed temporally sampled signal is proportional to a time-frequency energy distribution of the input signal.

In some embodiments of the system, the pulse source is operable to generate the periodic train of short pulses such that each pulse of the periodic train of short pulses has a pulse temporal width below the repetition period.

In some embodiments of the system, the temporal sampling unit is operable to generate the delayed temporal signal such that each sampled copy of the plurality of sampled copies of the input signal is: shifted by $q\omega_R$, and weighted by a Fourier coefficient of the periodic train of short pulses $P(q\omega_R)$ where $\omega_R$ is the repetition frequency and $q=0, \pm 1, \pm 2, \ldots, \pm \infty$.

In some embodiments of the system, the frequency-dependent time delay unit operable to generate the temporally sampled delayed signal comprising the plurality of delayed sampled copies such that each delayed sampled copy is shifted in time by the repetition period $T_R$, shifted in frequency by the repetition frequency $\omega_R$, and weighted by a Fourier coefficient of the periodic train of short pulses $P(q\omega_R)$.

In some embodiments of the system, each consecutive time slot has a duration corresponding to the repetition frequency $\omega_R$.

In some embodiments of the system, the N-th consecutive time slot is defined by:

$$NT_R - \frac{T_R}{2} \leq t_2 < NT_R + \frac{T_R}{2}$$

where $t_2=t_1-\Delta t_{latency}$ is a time variable of the delayed temporally sampled signal, $t_1$ is the time variable of the input signal, and $\Delta t_{latency}$ is a latency induced by at least one of the temporal sampling and the delaying, and $N=0, \pm 1, \pm 2, \ldots$.

In some embodiments of the system, the respective output signal is proportional to a time-mapped copy of a Fourier transform of the input signal truncated by a temporal window centered at $NT_R$.

In some embodiments of the system, the frequency dependent time delay unit is one of: a dispersion compensating fiber (DCF), and a chirped fiber Bragg grating.

In some embodiments of the system, the temporal evaluation unit comprises a temporal oscilloscope.

In some embodiments of the system, the input signal is in the microwave range, and the temporal sampling unit comprises an electro-optic modulator.

In some embodiments of the system, the input signal is in the optical range, the temporal sampling unit comprises a non-linear optical system, and the temporal evaluation unit comprises a temporal oscilloscope and a photodetector.

In some embodiments of the system, the system is a frequency-shifted feedback (FSF) laser system.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

With these fundamentals in place, we will now consider some non-limiting examples to illustrate various implementations of aspects of the present technology.

System

Figure 1:
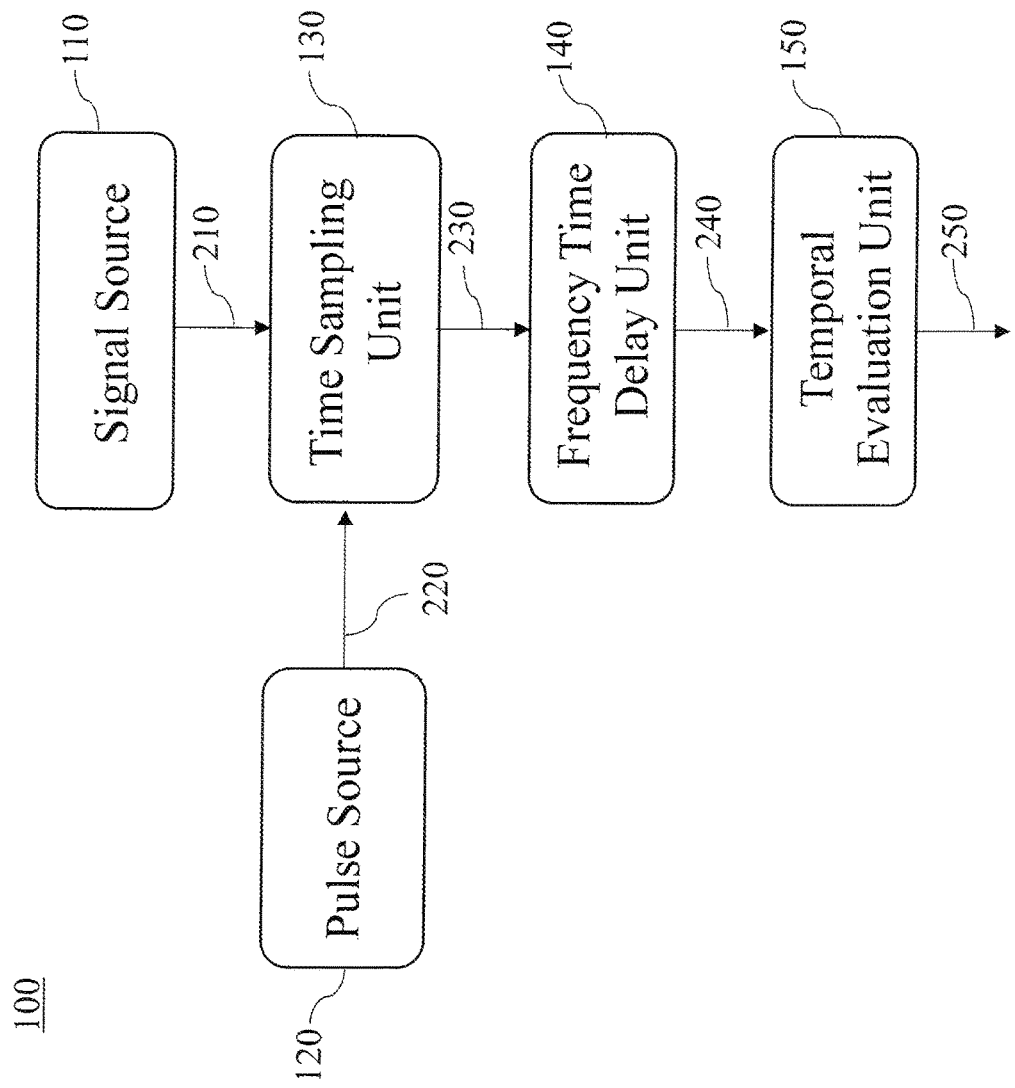
FIG. 1 depicts a schematic diagram of a system in accordance with non-limiting embodiments of the present technology.

With reference to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to: (i) receive an aperiodic continuous signal; (ii) generate a periodic train of short pulses; (iii) sample the aperiodic continuous signal using the periodic train of short pulses to obtain a temporally sampled signal; (iv) delay the temporally sampled waveform to obtain a delayed temporally sampled signal; and (v) evaluate the delayed temporally sampled signal over consecutive time slots to obtain a respective output signal for each consecutive time slot, a respective output signal in the time-frequency domain.

The system 100 comprises inter alia a signal source 110, a pulse source 220, a temporal sampling unit 130, and a frequency dependent time unit 140.

Figure 2:
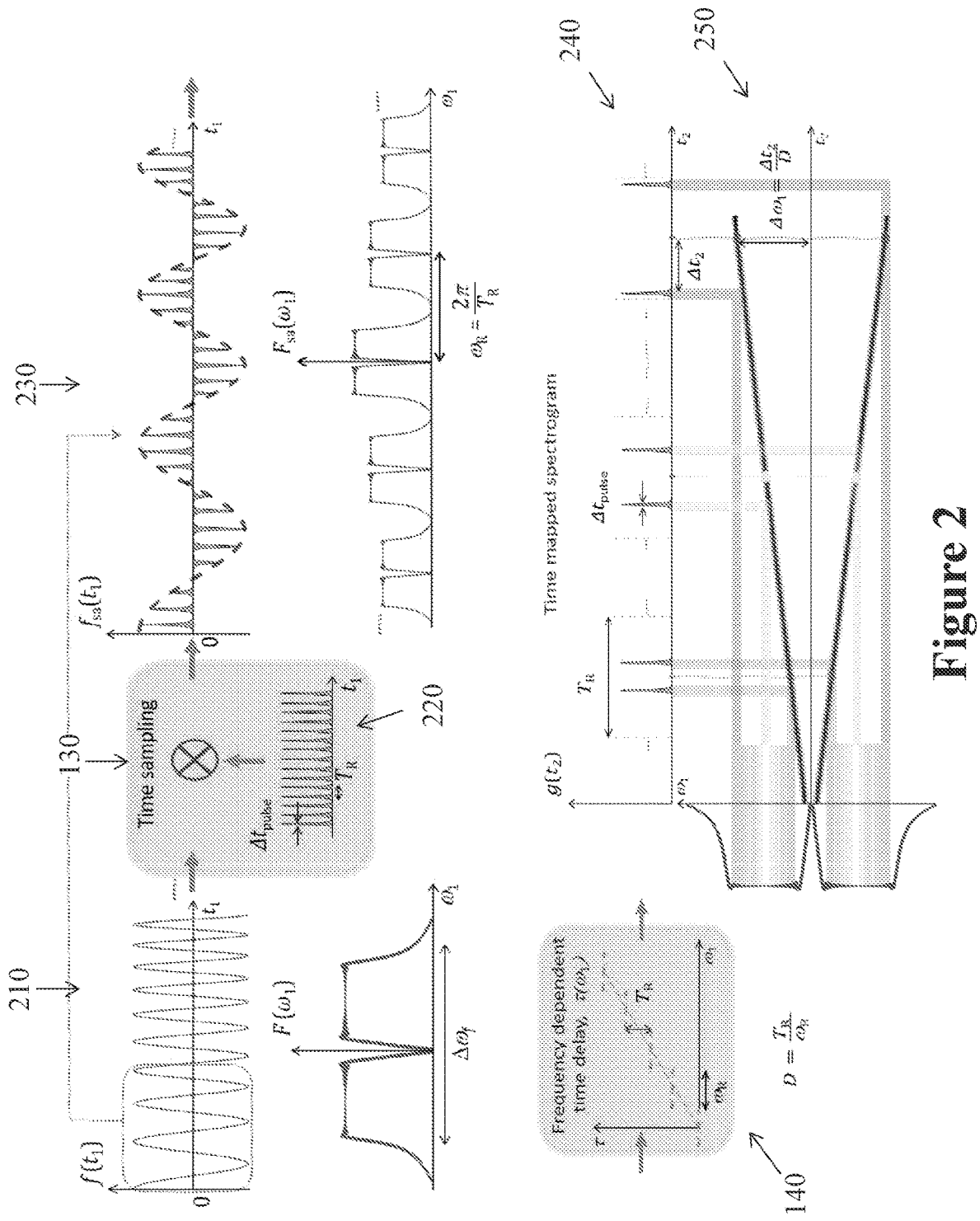
FIG. 2 depicts a schematic diagram of components of the system of FIG. 1 with plots of the input and output signals in accordance with non-limiting embodiments of the present technology.

Reference will also be made to FIG. 2, which depicts components of the system 100 and plots of the input and output signals.

Signal Source

The signal source 110 is configured to generate and transmit a continuous signal 210, which will be referred to as the initial signal 210. The initial signal 210 may be an aperiodic continuous signal. The initial signal 210 may be a signal in the microwave range, or in the optical range, but this does not need to be so in every embodiment of the present technology. In the illustrated embodiment, the initial signal 210 is an aperiodic continuous signal.

Generally speaking, the initial signal 210 may be expressed in the time-domain as $f(t_1)$, with a full bandwidth $\Delta\omega_f$, as best seen in FIG. 2. In the spectral domain, the signal 210 may be expressed as $F(\omega_1)$.

The short-time Fourier transform (STFT) or Fourier transform of consecutive time-windowed sections of $f(t_1)$ is expressed as equation (1):

$$STFT_f(\tau,\omega_1)=FT\{h(t_1-\tau)f(t_1)\}=\int_{-\infty}^{\infty}h(t_1-\tau)f(t_1)e^{-j\omega_1 t_1}dt_1 \quad (1)$$

Where $h(t)$ is a window function, also known as apodization function or tapering function, running along the entire duration of the STFT.

The spectrogram (SP) of the signal may be expressed by equation (2):

$$SP_f(\tau,\omega_1)=|STFT_f(\tau,\omega_1)|^2 \quad (2)$$

The signal source 110 transmits the initial signal 210 to the temporal sampling unit 130. The method for generating the STFT and the FT of the input signal 210 are explained below.

Pulse Source

The pulse source 120 is configured to generate a periodic train of short pulses or periodic sampling pulse train 220. It should be understood that the pulse source 120 may be any adequate device configured for generating the periodic train of short pulses 220. In one embodiment, the pulse source 120 is a pulsed laser.

The periodic train of short pulses 220 generated by the pulse source 120 may be expressed as in equation (3):

$$s(t_1) = \sum_m p(t_1 - m \cdot T_R) \quad (3)$$

where $p(t_1)$ is the temporal shape of each individual phase of the periodic train of short pulses 220 with a pulse width $\Delta t_{pulse}$ and repetition frequency of the pulse $$\omega_R = \frac{2\pi}{T_R}.$$

In FIG. 2, the initial signal 210 is depicted as a linear frequency chirp signal.

The spectral representation of an individual pulse of the periodic train of short pulses 220 is expressed in equation (4):

$$P(\omega_1)=FT\{p(t_1)\} \quad (4)$$

where the Fourier series development is used to obtain $P(\omega_1)$. The pulse width of each individual pulse is $\Delta t_{pulse}$ and the spectral width is $\sim\Delta\omega_{pulse}$.

The periodic train of short pulses 220 has a repetition period $T_R$ corresponding to a repetition frequency $\omega_R=2\pi/T_R$.

The pulse source 120 generates and transmits the periodic train of short pulses 220 which has a repetition period $T_R$, and a repetition frequency $\omega_R=2\pi/T_R$, where each individual pulse of the periodic train of short pulses 220 has a temporal pulse width $\Delta t_{pulse}$ and spectral width $\sim\Delta\omega_{pulse}$.

Temporal Sampling

The temporal sampling unit 130 is configured to sample the signal 210 using the periodic train of short pulses 220 or periodic sampling pulse train 220 to obtain a temporally sampled signal 230.

Under the Nyquist criterion day $\Delta\omega_f<\omega_R$, the waveform of the temporally sampled signal 230 may be expressed as in equation (5):

$$f_{ts} = f(t_1) \cdot \sum_m p(t_1 - m \cdot T_R) \propto f(t_1) \cdot \sum_q P(q\omega_R) \cdot e^{-jq\omega_R t_1} = \quad (5)$$

$$\sum_q P(q\omega_R) \cdot f(t_1) \cdot e^{-jq\omega_R t_1}$$

Where $f_{ts}$ is the waveform of the temporally sampled signal 230, and m, q=0, ±1, ±2, . . . , ±∞.

The temporally sampled signal 230 comprises a plurality of sampled copies of the input signal 210. Each factor of the waveform of the temporally sampled signal 230 i.e., $P(q\omega_R) \cdot f(t_1) \cdot e^{-jq\omega_R t_1}$, corresponds to a sampled copy of the input signal 210 frequency shifted by $q\omega_R$ and weighted by the corresponding Fourier coefficient of the sampling pulse, $P(q\omega_R)$.

It should be noted that the Nyquist criterion ensures that each sampled copy in the temporally sampled signal 230 extends over a frequency bandwidth narrower than $\omega_R$, thereby avoiding spectral overlapping.

The temporal sampling unit 130 transmits the temporally sampled signal 230, the temporally sampled signal 230 comprising a plurality of sampled copies, each sampled copy being shifted as a function of the repetition frequency $\omega_R$.

Frequency Dependent Time Delay

The frequency time delay unit 140 or dispersive unit 140 is configured to space and delay consecutive spectral copies of the temporally sampled signal 230 by frequency $\omega_R$, and an amount of time $\Delta\tau$ respectively to obtain a delayed temporally sampled signal 240. The delay can either increase or decrease as a function of increasing frequency.

The temporal waveform of the delayed temporally sampled signal 240 is expressed in equation (6):

$$g(t_2)e^{(j\omega_0 t_2)}, \quad (6)$$

Where $t_2=t_1-\Delta t_{latency}$ is the time variable at the output of the frequency time delay unit 140, and $\Delta t_{latency}$ is the latency which comprises the latency in the temporal sampling unit 130 and the frequency time delay unit 140.

The temporal complex envelope of the delayed temporally sampled signal 240 may be given by equation (9):

$$g(t_2) \propto \sum_q P(q\omega_R)f(t_2 - q\Delta\tau)e^{jq\omega_R(t_2-q\Delta\tau)} = \quad (7)$$

-continued $$\sum_q P(q\omega_R) \cdot f(t_2 - q\Delta\tau) \cdot e^{jq\omega_R t_2} \cdot e^{-jq^2\omega_R \Delta\tau}$$

Where $t_1 \rightarrow t_2 - q\Delta\tau$ accounts for the delay introduced by the temporal sampling unit 130 and the frequency time delay unit 140 on each of the spectral copies of temporally sampled signal 230, where a relative delay of $q\Delta\tau$ is introduced for the q-th spectral copy with respect to the original spectral copy, which corresponds to q=0, centered at $\omega_2=0$.

Thus, it can be seen that $g(t_2)$, consists of the coherent addition of a set of copies of the input signal 210 that are simultaneously shifted in time (with a relative delay between consecutive copies of $\Delta\tau$) and in frequency (with a relative frequency spacing between consecutive copies of $\omega_R$), while being weighted according to the frequency spectrum of the periodic train of short pulses 220 defined by the function $P(q\omega_R)$.

The frequency time delay unit 140 is configured such that the relative time delay between the consecutive spectral copies of temporally sampled signal 230 are equal to the sampling period $\Delta\tau=T_R$, which corresponds to $e^{-jq^2\omega_R\Delta\tau}=1$ for all values of q.

The frequency time delay unit 140 is configured such that, under the Nyquist criterion day $\Delta\omega_f < \omega_R$, consecutive spectral copies of the temporally sampled signal 230 are spaced by relative frequency $\omega_R$.

Thus, the frequency time delay unit 140 is configured to have a frequency-to-time scaling factor or group-delay dispersion which corresponds to a slope D of the dispersive delay process expressed in equation (8):

$$D = \pm \frac{T_R}{\omega_R} = \pm \frac{T_R^2}{2\pi} \tag{8}$$

The frequency time delay unit 140 is generally configured to have a frequency-dependent time delay such that $f(t_2)$ remains approximately constant over the temporal sampling period $\Delta\tau=T_R$.

The time slot of duration $T_R$ can be expressed as in equation (9):

$$NT_R - \frac{T_R}{2} \leq t_2 < NT_R + \frac{T_R}{2} \tag{9}$$

Where $N=0, \pm 1, \pm 2, \ldots$,

This enables to evaluate the delayed temporally sampled signal 240 represented by $g(t_2)$ over each of the time slots of duration $T_R$. At the $N^{th}$ time slot $f(t_2)$ can be approximated by $f(NT_r)$.

In one embodiment, the frequency time delay unit 140 is an optical fiber. In another embodiment, the frequency time delay unit 140 is a chirped fiber Bragg gratin. In the radio-frequency (RF) domain, frequency time delay unit 140 may be a fiber-optics dispersive line.

In one embodiment, the temporal sampling unit 130 and the frequency time delay unit 140 may be implemented as a single unit which performs temporal sampling and frequency dependent time delay of the initial signal 210.

Temporal Evaluation Unit

The temporal evaluation unit 150 is configured to evaluate the delayed temporally sampled signal 240 over each of the time slots of duration $T_R$ to obtain a respective output signal 250 or time-frequency representation 250.

The temporal evaluation unit 150 may perform evaluation of the delayed temporally sampled signal 240 via detection of the intensity profile of the temporal waveform. Generally, evaluation of the delayed temporally sampled signal 240 can be implemented by using a temporal evaluation unit 150 comprising a detection system fast enough to follow and/or store the output temporal waveform variation.

The temporal waveform of the delayed temporally sampled signal 240, evaluated along the $N^{th}$ time slot may be expressed as equation (10):

$$g_N(t') \propto \sum_q P(q\omega_R) \cdot f(NT_R - qT_R) \cdot e^{jq\omega_R t'} = \tag{10}$$

$$e^{jN\omega_R t'} \cdot \sum_{q'} P\left[(N-q')\frac{T_R}{D}\right] \cdot f(q'T_R) \cdot e^{-j\omega_1 q' T_R}$$

Where $t'=t_2-NT_R$, $q'=N-q$ with $q'=0, \pm 1, \pm 2, \ldots, \pm\infty$, and $\omega_1=t'/D$.

The temporal window function h(t), a time-limited function that serves as the temporal window running along the STFT is given by equation (11):

$$h(t)=P(\omega_1=-t/D) \tag{11}$$

Equation (10) may thus be rewritten as equation (12) by introducing the temporal window function of equation (11):

$$g_N(t') \propto e^{jN\omega_R t'} \sum_{q'} h(q'T_R - NT_R) f(q'T_R) e^{(-j\omega_1 q' T_R)} \tag{12}$$

The sum can be interpreted as the discretized version of the corresponding continuous-time integral form, sampled at $t_1 \rightarrow q'T_R$, and equation (12) can be rewritten as equation (13):

$$g_N(t') \propto e^{jN\omega_R t'} \int_{-\infty}^{\infty} h(t_1-NT_R) f(t_1) e^{(-j\omega_1 t_1)} dt_1 \tag{13}$$

where $\omega_1=t'/D$.

The equivalence between the discretized and continuous-time versions of the same expression in equation (12) and (13) is based on the fact that the temporal sampling process used to establish the equivalence, $t_1 \rightarrow q'T_R$, satisfies the Nyquist criterion in regard to both: the input signal 210 represented by $f(t_1)$ (as per the specifications of the temporal sampling unit 130), and the newly defined temporal window function $h(t_1)$.

It should be noted that sampling the window function $h(t_1)$ at $q'T_R$ corresponds to sampling the pulse frequency spectrum, $P(\omega_1)$, at $q'\omega_R$, which satisfies the Nyquist criterion, under the condition that the pulse temporal width is shorter than the sampling period $\Delta t_{pulse} < T_R$.

With equation (13) involving a Fourier integral, equation (13) can be rewritten as equation (14):

$$g_N(t') = e^{jN\omega_R t'} \cdot STFT_f\left(NT_R, \omega_1 = \frac{t_2 - NT_R}{D}\right) \tag{14}$$

Thus, the temporal waveform of the delayed temporally sampled signal 240 evaluated at each time slot $$NT_R - \frac{T_R}{2} \leq t_2 < NT_R + \frac{T_R}{2}$$

is proportional to: the linear phase term $e^{jN\omega_R t'}$ multiplied by the time-mapped copy of the Fourier transform of the signal truncated by a temporal window centered at $NT_R$. The delayed temporally sampled signal 240 evaluated at each consecutive time slot enables the time-frequency representation 250 of the initial signal 210.

In other words, at the output of the temporal evaluation unit 150, the STFT of the input signal 210 is mapped along the time domain within each analysis period of duration $T_R$, changing period by period as the temporal analysis window is "virtually" shifted by this same delay ($T_R$).

The intensity of the output temporal waveform is proportional to a full spectrogram or time-frequency energy distribution of the SUT expressed as in equation (15):

$$|g_N(t_2)|^2 \propto SP_f\left(NT_R, \omega_1 = \frac{t_2 - NT_R}{D}\right) \quad (14)$$

A distinctive feature of a spectrogram analysis is that the time and frequency resolutions of the resulting TF distribution are inversely proportional, as imposed by the FT uncertainty principle.

The time resolution of the obtained spectrogram is determined by the duration of the analysis window $\Delta t_{window} \approx |D| \times \Delta \omega_{pulse}$, where $\Delta \omega_{pulse}$ is the sampling pulse bandwidth, and the SP frequency resolution is given by $\Delta \omega_{window} \approx \Delta t_{pulse}/|D|$, which corresponds to a resolution in the time-mapped spectrum directly fixed by the sampling pulse width, $\Delta t_{pulse}$. The joint time-frequency resolution in the obtained real-time spectrogram can then be easily customized by adjusting the sampling pulse width $\Delta t_{pulse}$ of the periodic train of short pulses 220.

In one embodiment, the temporal evaluation unit 150 may comprise a temporal oscilloscope to perform the evaluation of the delayed temporally sampled signal 240. In embodiments where the input signal 210 is in the optical range, the temporal evaluation unit 150 may comprise a temporal oscilloscope and a photodetector. The delay can either increase or decrease as a function of increasing frequency.

Figure 3:
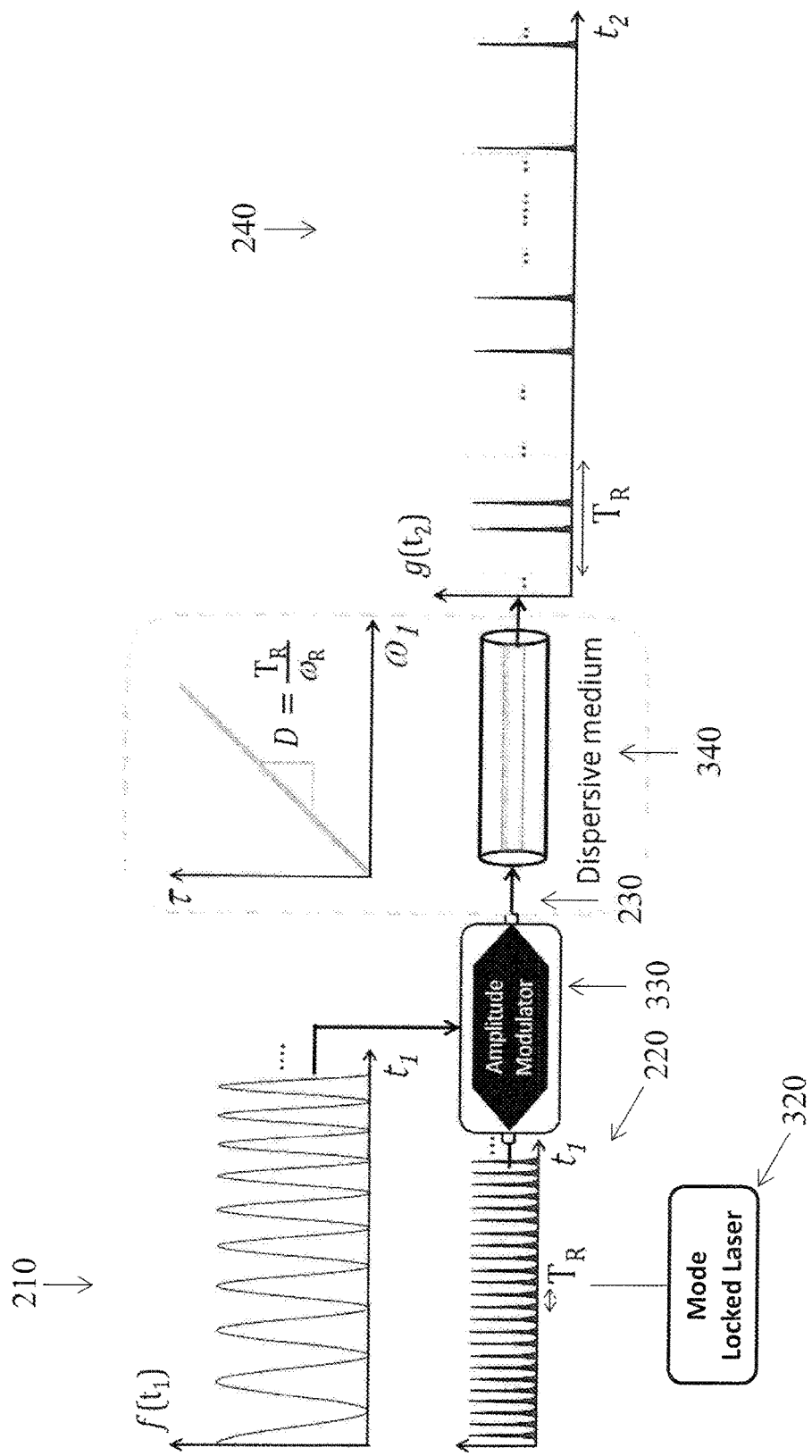
FIG. 3 depicts a schematic diagram of a first practical implementation of the system of FIG. 1 in accordance with non-limiting embodiments of the present technology.

FIG. 3 depicts a schematic diagram of one implementation of the system 100 as system 300 in accordance with non-limiting embodiments of the present technology.

Generally speaking, the system 300 uses short optical pulse modulation and a dispersive optical delay line to obtain a time mapped spectrogram. The system 300 may be used for high-speed microwave or optical signals.

The system 300 comprises a mode locked laser 320, an amplitude modulator 330 and dispersive optical delay line 340.

The pulse source 120 of FIG. 1 is implemented as the mode locked laser 320.

The temporal sampling unit 130 of FIG. 1 is implemented as an amplitude modulator 330. The amplitude modulator 330 may be as a non-limiting example an electro-optic modulator (OEM) in embodiments where the initial signal 210 is in the microwave frequency range. In embodiments where the initial signal 210 is in the optical frequency range, the amplitude modulator 330 may be a non-linear optics process, the implementation of which is known to a person skilled in the art of the present technology.

The frequency dependent time delay unit 140 of FIG. 1 is implemented as a dispersive optical delay line 340. The dispersive optical delay line 340 may be one of a dispersion compensating fiber (DCF) or a chirped fiber Bragg grating to provide a linear group delay as a function of radial frequency.

Figure 4:
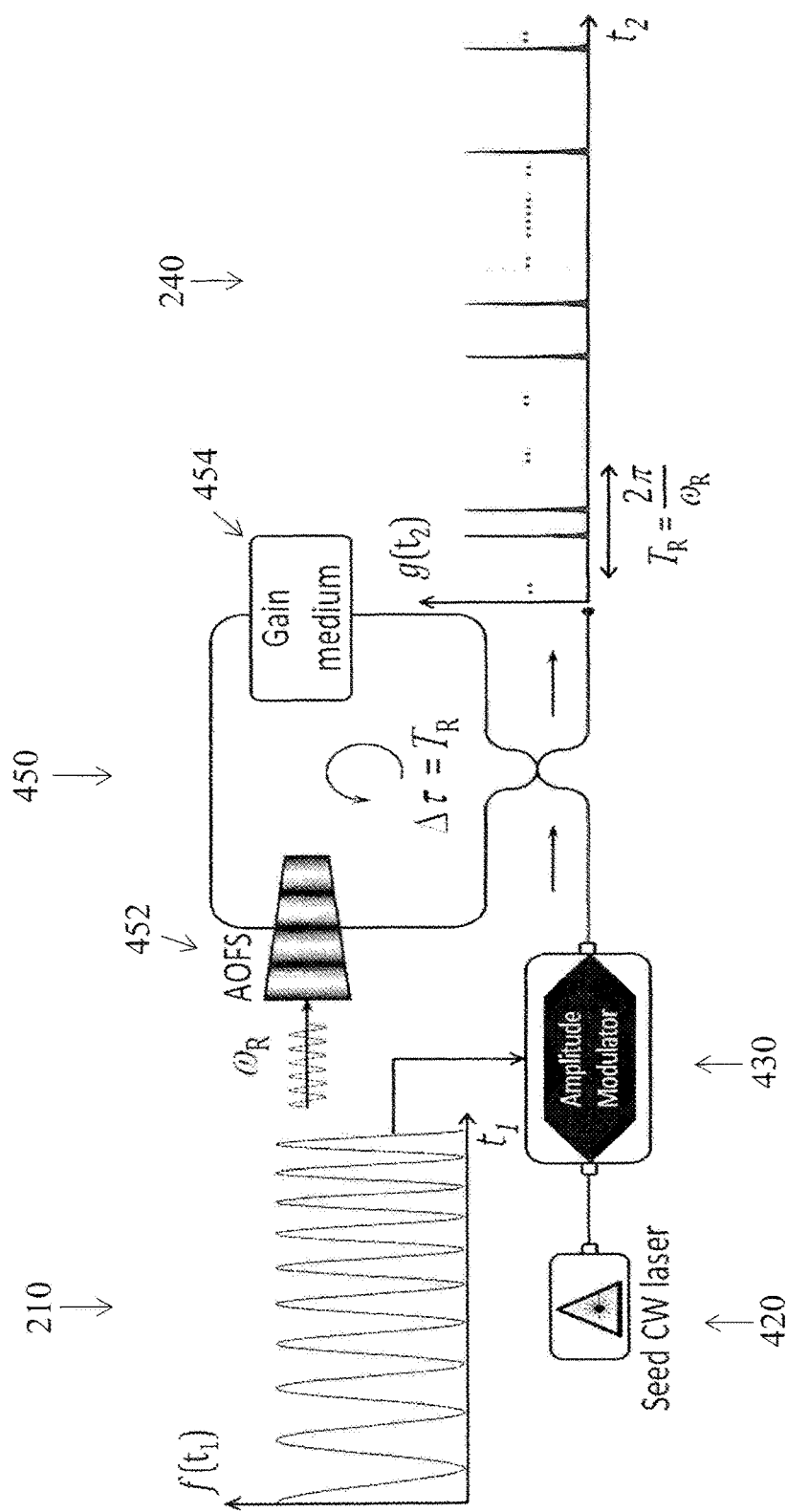
FIG. 4 depicts a schematic diagram of a second practical implementation of the system of FIG. 1 in accordance with non-limiting embodiments of the present technology.

FIG. 4 depicts a schematic diagram of one implementation of the system 100 as a system 400 in accordance with non-limiting embodiments of the present technology.

Generally speaking, the system 400 uses a frequency-shifted feedback (FSF) laser system seeded with the input signal. The system 400 implements a process equivalent to temporal sampling with a short-pulse train.

The system 400 comprises a mode locked laser 420, an amplitude modulator 440, a FSF cavity 450, the FSF cavity 450 comprising an acousto-optics frequency shifter (AOFS) 452, and a gain medium 454. The FSF cavity 450 is seeded with the input signal 210.

The pulse source 120 of FIG. 1 is implemented as the mode locked laser 420.

The temporal sampling unit 130 of FIG. 1 is implemented as an amplitude modulator 330. The amplitude modulator 330 may be as a non-limiting example an electro-optic modulator (OEM) in embodiments where the initial signal 210 is in the microwave frequency range The AOFS 452 receives as an input the input signal 210. The AOFS 452 is driven a ta frequency $$f_s = \frac{\omega_s}{2\pi}$$

resulting in a frequency shift per round trip equal to $f_s$. Here, the AOFS 452 is driven at frequency $$f_r = \frac{\omega_R}{2\pi}.$$

Generally, the round-trip time of the FSF cavity 450 is $$\tau_c = \frac{1}{f_c} = \frac{2\pi}{\omega_c}.$$

The FSF cavity 450 is configured such that the round-trip time is $\tau_c = \Delta \tau = T_R$.

The gain medium 454 has a transfer function $H(\omega)$. In one embodiment, the gain medium 454 is a tapered amplifier. Generally, any kind of amplification system over the frequency bandwidth of the circulating signal could be used. As a non-limiting example, an erbium doped fiber amplifier (EDFA), or a semiconductor optical amplifier (SOA) could be used.

The FSF cavity 450 further comprises an optical amplifier (not depicted) to compensate for the cavity losses and to compensate for cavity losses and to increase photon lifetime. The FSF cavity 450 comprises a coupler (not depicted) for seeding the loop and extracting a fraction of the intracavity light field.

At each pass through the FSF cavity 450, a copy of the initial signal 210 shifted by frequency $$f_r = \frac{\omega_R}{2\pi}$$

is generated, and the frequency-shifted copies are delayed with respect to each other by the FSF cavity 450 round-trip time corresponding to $\tau_c=T_R$.

Thus, the system 400 is equivalent to the system 300.

Figure 5:
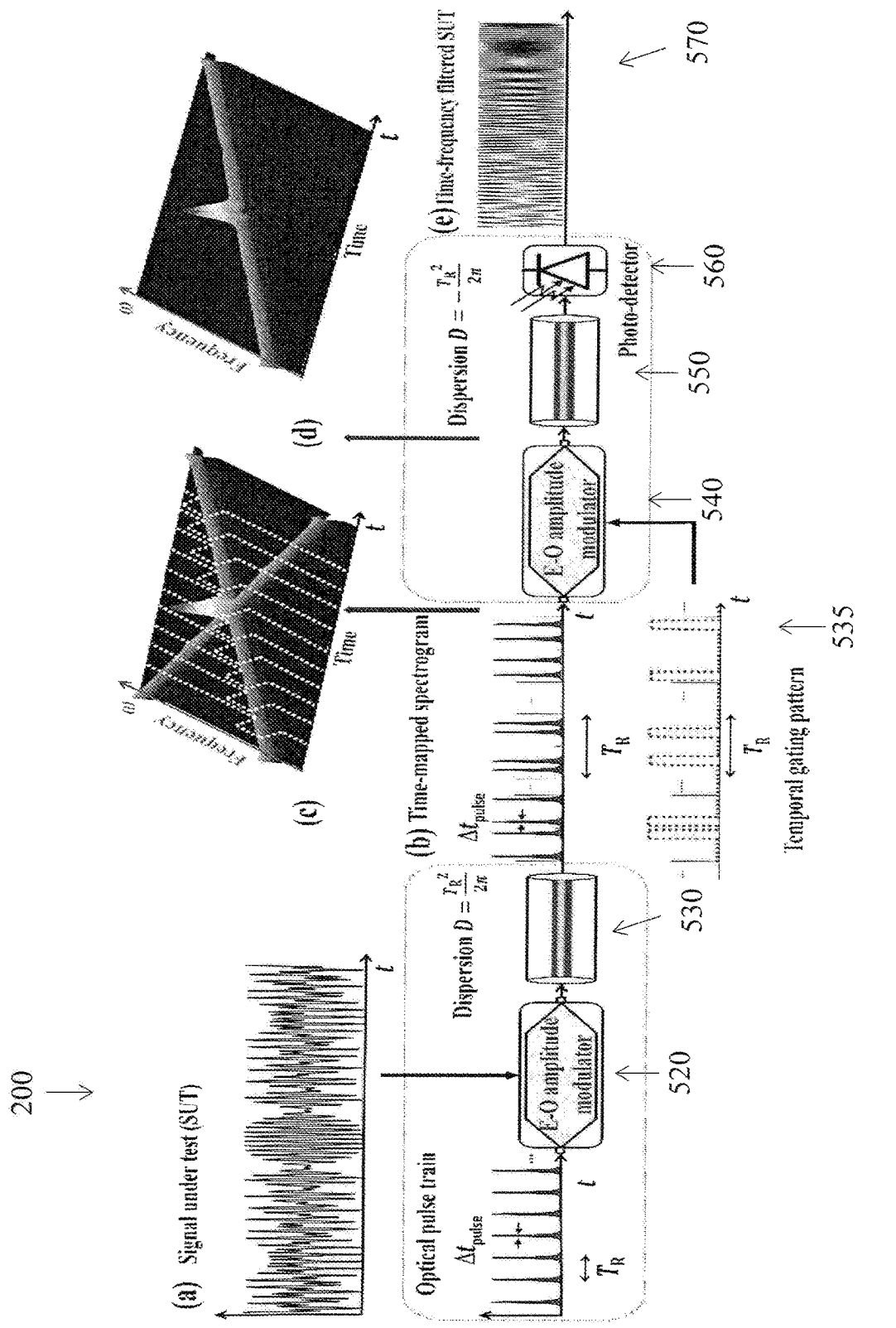
FIG. 5 depicts a schematic diagram of a system for processing a time-frequency signal in accordance with non-limiting embodiments of the present technology.

FIG. 5 depicts a schematic diagram of a system 500 for time-frequency filtering of temporal wave forms in the analog in accordance with non-limiting embodiments of the present technology.

The system 500 components of the system 300: a mode locked laser (not depicted), a first amplitude modulator 520, a first dispersive optical delay line 530, a second amplitude modulator 540, a second dispersive optical delay line 550, a low pass filter 560.

At the output of the first dispersive optical delay line, the delayed temporally sampled signal 240 may be processed as a non-limiting example by performing time-variant frequency filtering, re-shaping of a waveform to provide a prescribed time-frequency distribution (so-called time-frequency synthesis), or pattern identification in the joint time-frequency plane to obtain an output signal 535.

In this embodiment, the output signal 535 is recovered back by passing through a second amplitude modulator 540 similar to the first amplitude modulator 520, a second dispersive optical delay line 540 implemented as a chromatic dispersive delay line with opposite dispersion of the first dispersive optical delay line 330

$$D = \mp \frac{T_R^2}{2\pi}$$

and a low pass filter 560. The low pass filter 560 may be implemented as a photo-detector.

The time-frequency filtered signal 570 is then output.

The system 500 enables processing continuously an input signal in real-time, where the processing comprises time-variant frequency filtering, re-shaping of a waveform to provide a prescribed time-frequency distribution (so-called time-frequency synthesis), or pattern identification in the joint time-frequency plane.

Figure 6:
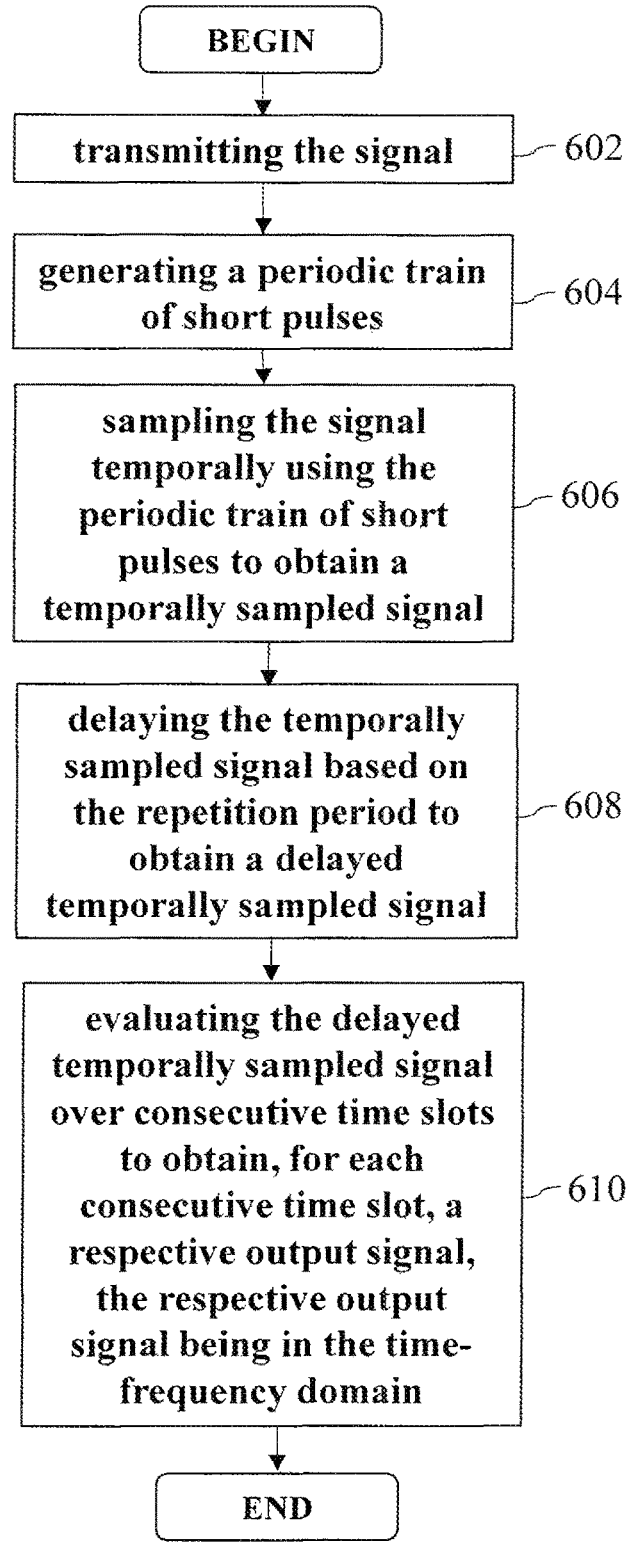
FIG. 6 depicts a flow chart of a method of generating a time-frequency representation of an input signal in accordance with non-limiting embodiments of the present technology.

FIG. 6 depicts a flowchart of a method 600 of generating a time-frequency representation of an input signal according to non-limiting embodiments of the present technology.

Method 600 may be executed within the system 100, system 300, or system 400.

Method Description

The method 600 begins at step 602.

STEP 602: Transmitting the Signal

At step 602, the signal source 110 transmits the signal 210. In one embodiment, the signal 210 is an aperiodic continuous signal. The signal 210 is represented by $f(t_1)$, with a full bandwidth $\Delta\omega_f$.

The method 600 advances to step 604.

STEP 604: Generating a Periodic Train of Short Pulses

At step 604, the pulse source 120 is activated to generate a periodic train of short pulses 220. The periodic train of short pulses 220 has a repetition period $T_R$, a repetition frequency $$\omega_R = \frac{2\pi}{T_R},$$

where each individual pulse of the periodic train of short pulses 220 has a temporal pulse width $\Delta t_{pulse}$ and spectral width $\sim\Delta\omega_{pulse}$.

The method 600 advances to step 606.

STEP 606: Sampling the Signal Temporally Using the Periodic Train of Short Pulses to Obtain a Temporally Sampled Signal At step 606, the temporal sampling unit 130 temporally samples the input signal 210 using the periodic train of short pulses 220 to obtain a temporally sampled signal 230. The temporally sampled signal 230 comprises a plurality of sampled copies of the input signal 210, each sampled copy being spaced in function of the repetition frequency of the periodic train of short pulses. Each sampled copy corresponds to a copy of the input signal 210 frequency shifted by $q\omega_R$ and weighted by the corresponding Fourier coefficient of the sampling pulse, $P(q\omega_R)$.

The method 600 advances to step 608.

STEP 608: Delaying the Temporally Sampled Signal Based on the Repetition Period to Obtain a Delayed Temporally Sampled Signal At step 608, the frequency dependent time delay unit 140 delays the temporally sampled signal based on the repetition period to obtain a delayed temporally sampled signal 240, the delayed temporally sampled signal 240 comprising a plurality of delayed sampled copies of the input signal 210, a spectral representation of a given delayed sampled copy being delayed in function of the repetition frequency In one embodiment, the frequency dependent time delay unit 140 has frequency-to-time scaling factor of the initial signal which corresponds to a slope D of the dispersive delay process expressed by $$D = \pm \frac{T_R}{\omega_R} = \pm \frac{T_R^2}{2\pi}.$$

The method 600 advances to step 610.

STEP 610: Evaluating the Delayed Temporally Sampled Signal Over Consecutive Time Slots to Obtain, for Each Consecutive Time Slot, a Respective Output Signal, the Respective Output Signal Being in the Time-Frequency Domain At step 610, the temporal evaluation unit 150 evaluates the delayed temporally sampled signal 240 over consecutive time slots to obtain, for each consecutive time slot, a respective output signal 250, the respective output signal 250 being in the time-frequency domain.

Each consecutive time slot has a duration corresponding to the repetition frequency $\omega_R$. The $N^{th}$ consecutive time slot is defined by:

$$NT_R - \frac{T_R}{2} \leq t_2 < NT_R + \frac{T_R}{2}$$

where $t_2=t_1-\Delta t_{latency}$ is a time variable of the delayed temporally sampled signal, $t_1$ is the time variable of the input signal, and $\Delta t_{latency}$ is a latency induced by at least one of the temporal sampling and the delaying, and N=0, ±1, ±2, etc. The respective output signal is proportional to a time-mapped copy of a Fourier transform of the input signal truncated by a temporal window centered at $NT_R$ The method 600 then ends.

In one embodiment, the delayed temporally sampled signal 240 may be processed to perform time-variant frequency filtering, re-shaping of a waveform to provide a prescribed time-frequency distribution (so-called time-frequency synthesis), or pattern identification in the joint time-frequency plane.

The processed delayed temporally sampled signal 240 may be recovered to obtain a time-frequency filtered signal 570 by using additional components similar to the system 100, i.e., a second temporal sampling unit, a second frequency time delay unit, with the addition of a low pass filter. The second frequency time delay unit is similar to the frequency time delay unit 140 but has a frequency-to-time scaling factor or group-delay dispersion opposite the frequency time delay unit, i.e.

$$D = \mp \frac{T_R}{\omega_R} = \mp \frac{T_R^2}{2\pi}$$

is used. A low pass filter 560. The low pass filter 560 may be implemented as a photo-detector. The input signal 210 may thus be processed to obtain a time-frequency filtered signal.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for generating a time-frequency representation of an aperiodic continuous input signal, the method comprising:
   receiving the input signal;
   generating a periodic train of pulses, the periodic train of pulses having a repetition period corresponding to a repetition frequency, the repetition frequency being below a bandwidth of the input signal, each pulse of the periodic train of pulses having a pulse temporal width, and the pulse temporal width being below the repetition period;
   sampling the input signal temporally using the periodic train of pulses to obtain a temporally sampled signal, the temporally sampled signal comprising a plurality of sampled copies of the input signal, each sampled copy being spaced in function of the repetition frequency of the periodic train of pulses;
   delaying the temporally sampled signal based on the repetition period to obtain a delayed temporally sampled signal, the delayed temporally sampled signal comprising a plurality of delayed sampled copies, a spectral representation of a given delayed sampled copy being delayed in function of the repetition frequency;
   evaluating the delayed temporally sampled signal over consecutive time slots to obtain, for each consecutive time slot, a respective output signal, the respective output signal being in the time-frequency domain.

2. The method of claim 1, wherein an intensity of the delayed temporally sampled signal is proportional to a time-frequency energy distribution of the input signal.

3. The method of claim 1, wherein each sampled copy of the plurality of sampled copies of the input signal is: shifted by $q\omega_R$, and weighted by a Fourier coefficient of the periodic train of pulses $P(q\omega_R)$ where $\omega_R$ is the repetition frequency and $q=0, \pm 1, \pm 2, \ldots, \pm\infty$.

4. The method of claim 3, wherein each consecutive time slot has a duration corresponding to the repetition frequency $\omega_R$.

5. The method of claim 3, wherein each delayed sampled copy is shifted in time by the repetition period $T_R$, shifted in frequency by the repetition frequency $\omega_R$, and weighted by a Fourier coefficient of the periodic train of pulses $P(q\omega_R)$.

6. The method of claim 4, wherein the N-th consecutive time slot is defined by:

$$NT_R - \frac{T_R}{2} \leq t_2 < NT_R + \frac{T_R}{2}$$

where $t_2 = t_1 - \Delta t_{latency}$ is a time variable of the delayed temporally sampled signal,
$t_1$ is the time variable of the input signal, and $\Delta t_{latency}$ is a latency induced by at least one of the temporal sampling and the delaying, and $N=0, \pm 1, \pm 2, \ldots$.

7. The method of claim 6, wherein the respective output signal is proportional to a time-mapped copy of a Fourier transform of the input signal truncated by a temporal window centered at $NT_R$.

8. The method of claim 1, wherein the sampling is executed by a temporal sampling unit; wherein the evaluating is executed by a temporal evaluation unit; and wherein the delaying is executed by a frequency dependent time delay unit.

9. The method of claim 8, wherein the frequency dependent time delay unit is one of: a dispersion compensating fiber (DCF), and a chirped fiber Bragg grating.

10. An analog system for generating a time-frequency representation of a continuous aperiodic input signal, the system comprising:
    a pulse source operable to generate a periodic train of pulses, the periodic train of pulses having a repetition period corresponding to a repetition frequency, the repetition frequency being below a bandwidth of the input signal, each pulse of the periodic train of pulses having a pulse temporal width, and the pulse temporal width being below the repetition period;
    a temporal sampling unit operable to sample the input signal using the periodic train of pulses to generate a delayed temporally sampled signal, the delayed temporally sampled signal comprising a plurality of sampled copies of the input signal, each sampled copy being spaced in function of the repetition frequency of the periodic train of pulses;
    a frequency-dependent time delay unit operable to generate, based on the plurality of sampled copies of the input signal and the repetition period, a temporally sampled delayed signal comprising a plurality of delayed sampled copies of the input signal, a spectral representation of a given delayed sampled copy being delayed in function of the repetition frequency; and
    a temporal evaluation unit operable to evaluate the delayed temporally sampled signal over consecutive time slots to obtain, for each consecutive time slot, a respective output signal, the respective output signal being in the time-frequency domain.

11. The system of claim 10, wherein an intensity of the delayed temporally sampled signal is proportional to a time-frequency energy distribution of the input signal.

12. The system of claim 10, wherein the temporal sampling unit is operable to generate the delayed temporal signal such that each sampled copy of the plurality of sampled copies of the input signal is: shifted by $q\omega_R$, and weighted by a Fourier coefficient of the periodic train of short pulses $P(q\omega_R)$ where $\omega_R$ is the repetition frequency and $q=0, \pm 1, \pm 2, \ldots, \pm\infty$.

13. The system of claim 10, wherein the frequency-dependent time delay unit operable to generate the temporally sampled delayed signal comprising the plurality of delayed sampled copies such that each delayed sampled copy is shifted in time by the repetition period $T_R$, shifted in frequency by the repetition frequency $\omega_R$, and weighted by a Fourier coefficient of the periodic train of pulses $P(q\omega_R)$.

14. The system of claim 13, wherein each consecutive time slot has a duration corresponding to the repetition frequency $\omega_R$.

15. The system of claim 14, wherein the N-th consecutive time slot is defined by:

$$NT_R - \frac{T_R}{2} \le t_2 < NT_R + \frac{T_R}{2}$$

where $t_2 = t_1 - \Delta t_{latency}$ is a time variable of the delayed temporally sampled signal, $t_1$ is the time variable of the input signal, and $\Delta_{latency}$ is a latency induced by at least one of the temporal sampling and the delaying, and $N=0, \pm 1, \pm 2, \ldots$.

16. The system of claim 15, wherein the respective output signal is proportional to a time-mapped copy of a Fourier transform of the input signal truncated by a temporal window centered at $NT_R$.

17. The system of claim 11, wherein the frequency dependent time delay unit i one of: a dispersion compensating fiber (DCF), and a chirped fiber Bragg grating.

18. The system of claim 11, wherein the temporal evaluation unit comprises a temporal oscilloscope.

19. The system of claim 11, wherein
the input signal is in the microwave range; and wherein
the temporal sampling unit comprises an electro-optic modulator.

20. The system of claim 11, wherein
the input signal is in the optical range; wherein
the temporal sampling unit comprises a non-linear optical system; and wherein
the temporal evaluation unit comprises a temporal oscilloscope and a photodetector.

21. The system of claim 11, wherein the system is a frequency-shifted feedback (FSF) laser system.

* * * * *